United States Patent
Sawa

(10) Patent No.: US 9,692,938 B2
(45) Date of Patent: Jun. 27, 2017

(54) IMAGE FORMING APPARATUS

(71) Applicant: KYOCERA Document Solutions Inc., Osaka (JP)

(72) Inventor: Naoki Sawa, Osaka (JP)

(73) Assignee: KYOCERA Document Solutions Inc., Tamatsukuri, Chou-ku, Osaka (JP)

(*) Notice: Subject to any disclaimer, the term of this patent is extended or adjusted under 35 U.S.C. 154(b) by 0 days.

(21) Appl. No.: 15/218,443

(22) Filed: Jul. 25, 2016

(65) Prior Publication Data
US 2017/0034394 A1 Feb. 2, 2017

(30) Foreign Application Priority Data
Jul. 30, 2015 (JP) .................... 2015-151255

(51) Int. Cl.
  *H04N 1/60* (2006.01)
  *H04N 1/407* (2006.01)
(52) U.S. Cl.
  CPC ... *H04N 1/4072* (2013.01); *H04N 2201/0065* (2013.01); *H04N 2201/0094* (2013.01)
(58) Field of Classification Search
  None
  See application file for complete search history.

(56) References Cited

U.S. PATENT DOCUMENTS

| | | | | |
|---|---|---|---|---|
| 5,982,931 A * | 11/1999 | Ishimaru | ................ | G06K 9/64 382/218 |
| 7,783,080 B2 * | 8/2010 | Itoh | ................ | G06K 17/00 358/1.14 |
| 8,265,345 B2 * | 9/2012 | Gotoh | ................ | G06K 9/00442 358/1.9 |
| 8,422,796 B2 * | 4/2013 | Kitai | ................ | G06F 17/243 382/176 |
| 8,509,535 B2 * | 8/2013 | Hartmann | ........... | G06F 17/2211 382/179 |
| 2004/0223648 A1 * | 11/2004 | Hoene | ................ | G06F 17/2211 382/218 |
| 2007/0091393 A1 * | 4/2007 | Matsumoto | ........ | G06K 9/00442 358/538 |
| 2015/0350476 A1 * | 12/2015 | Nakao | ................ | H04N 1/00336 358/448 |

FOREIGN PATENT DOCUMENTS

| | | |
|---|---|---|
| JP | 2005-086709 A | 3/2005 |
| JP | 2013-046099 A | 3/2013 |

* cited by examiner

*Primary Examiner* — Dung Tran
(74) *Attorney, Agent, or Firm* — IP Business Solutions, LLC

(57) ABSTRACT

An image forming apparatus includes a document reading unit, an image forming unit, an image data saving unit, a correction instruction detection unit, an image correction unit, and a controller. The document reading unit reads an image on a source document and acquires image data. The image forming unit prints an image on a recording sheet according to the image data. The image data saving unit saves the image data of image printed by the image forming unit on the recording sheet. The correction instruction detection unit detects the correction instruction written on the recording sheet on which the image is printed. The image correction unit corrects the image data stored in the image data saving unit, according to the correction instruction detected by the detection unit. The controller causes the image forming unit to print an image representing the image data corrected by the image correction unit.

9 Claims, 11 Drawing Sheets

Fig.2A

| CORRECTION DETAIL | CODE |
|---|---|
| DENSITY | ▲ |
| ZOOM IN/OUT | ✚ |
| CHROMA | ● |

| CORRECTION REGION (UPPER LEFT COORDINATE, LOWER RIGHT COORDINATE) | CORRECTION DETAIL |
|---|---|
| CORRECTION REGION E1 | DENSITY (+1) |
| CORRECTION REGION E2 | ZOOM IN/OUT (+1) |
| CORRECTION REGION E3 | CHROMA (−2) |
|  |  |

| SPECIAL COPY SETTING | |
|---|---|
| CORRECTION OF HAND WRITING | B1 |
| ADDITIONAL CORRECTION OF HAND WRITING | B2 |
| FINISH CORRECTION OF HAND WRITING | B3 |
| CODE SELECTION | B4 |
| CODE GENERATION | B5 |

OK    CANCEL

CODE SELECTION

|  | B11 / B21 | B12 / B22 | B13 / B23 | B14 / B24 | B15 / B25 |
|---|---|---|---|---|---|
| DENSITY | ▲ | ✚ | ● | ■ | ★ |
| ZOOM IN/OUT | ▲ | ✚ | ● | ■ | ★ |
| CHROMA | ▲ | ✚ | ● | ■ | ★ |
|  | B31 | B32 | B33 | B34 | B35 |

OK    CANCEL

D2

IMAGE FORMING APPARATUS

INCORPORATION BY REFERENCE

This application claims priority to Japanese Patent Application No.2015-151255 filed on Jul. 30, 2015, the entire contents of which are incorporated by reference herein.

BACKGROUND

The present disclosure relates to an image forming apparatus, and in particular to a technique to correct an image to be printed.

For example, when a collection of messages or a sheet on which paper pieces each having one's message written thereon are stuck is copied by an image forming apparatus, the density and sizes of characters and patterns on the printed result may become uneven owing to differences in pen pressure and letter sizes among individuals, which may result in uneven balance of the printed matter as a whole. For example, letters written with low pen pressure is faintly printed, and letters written with high pen pressure are densely printed.

In such a case, the print density may be adjusted so as to densely print the letters written with low pen pressure. However, since the setting of the print density is applied to the entire image, the adjustment is by no means easy. For example, when the print density is set to a high level, the letters written with high pen pressure may be too densely printed, and shades along the boundary between the paper pieces may become too prominent. In addition, the adjustment of the print density may not always result in improved balance. Accordingly, for example, techniques of correcting printed content on a printed matter have been proposed.

Further, printing conditions such as the print density are to be specified in the image forming apparatus, menu buttons and adjustment buttons prepared in the image forming apparatus have to be operated, for example through a touch panel. Such operation for inputting the image correction instruction is not only complicated, but also time-consuming.

SUMMARY

The disclosure proposes further improvement of the foregoing technique.

In an aspect, the disclosure provides an image forming apparatus including a document reading unit, an image forming unit, a saving unit, a detection unit, a correction unit, and a controller.

The document reading unit reads an image on a source document and acquires image data.

The image forming unit prints an image on a recording sheet according to the image data.

The saving unit saves the image data of images previously printed by the image forming unit on the recording sheet.

The detection unit extracts difference between the image data on the recording sheet read by the document reading unit and on which a correction instruction is written and the image data stored in the saving unit and corresponding the image data on the recording sheet on which the correction instruction is written, and detects the correction instruction on a basis of the extracted difference.

The correction unit corrects the image data stored in the saving unit, according to the correction instruction detected by the detection unit.

The controller causes the image forming unit to print an image representing the image data corrected by the correction unit.

The correction instruction includes region information indicating a correction region to be corrected by the correction unit, and correction information indicating a detail of the correction to be applied to the correction region.

The correction unit further corrects the image data in the region indicated by the region information included in the correction instruction detected by the detection unit, according to the correction detail indicated by the correction information included in the correction instruction.

BRIEF DESCRIPTION OF THE DRAWINGS

FIG. 2A and FIG. 2B are tables each showing an example of data structure in each storage unit.

FIG. 3A, FIG. 3B, and FIG. 3C are schematic drawings each showing an example of an operation screen.

DETAILED DESCRIPTION

Figure 1:
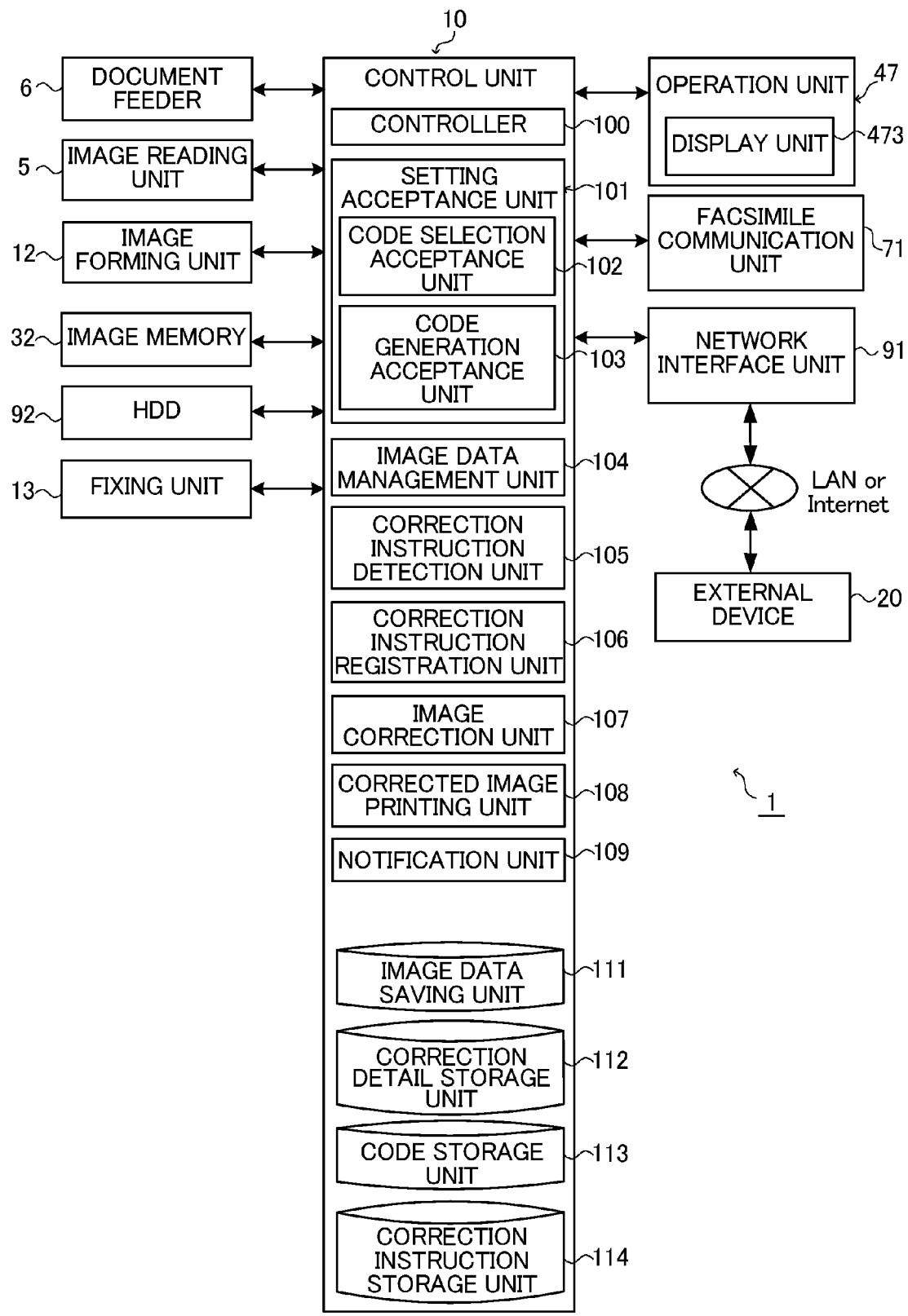
FIG. 1 is a functional block diagram schematically showing an essential internal configuration of an image forming apparatus according to a first embodiment of the disclosure.

Hereafter, an image forming apparatus according to some embodiments of the disclosure will be described with reference to the drawings. FIG. 1 is a functional block diagram schematically showing an essential internal configuration of the image forming apparatus according to a first embodiment of the disclosure.

The image forming apparatus 1 is a multifunction peripheral having a plurality of functions, such as copying, printing, scanning, and facsimile transmission, and includes a control unit 10, a document feeder 6, a document reading unit 5, an image forming unit 12, an image memory 32, a hard disk drive (HDD) 92, a fixing unit 13, an operation unit 47, a facsimile communication unit 71, and a network interface unit 91.

The document feeder 6 feeds a source document to be read to the document reading unit 5.

The document reading unit 5 includes a non-illustrated reading mechanism having a light emitting unit and a charge coupled device (CCD) sensor, and is configured to read an image from the source document delivered from the document feeder 6 or placed on a platen glass, by irradiating the source document with the light emitting unit and receiving the reflected light with the CCD sensor, under the control of a controller 100 included in the control unit 10.

The image forming unit 12 forms a toner image of the image to be printed, on the recording sheet. The fixing unit 13 fixes the toner image by thermal compression, onto the recording sheet.

The image memory 32 is a region for temporarily storing the image data acquired through the document reading performed by the document reading unit 5, and image data to be formed into an image by the image forming unit 12.

The HDD92 is a large-capacity storage device for storing, for example, the source image read by the document reading unit 5.

The operation unit 47 is used to input user's instructions to execute the image forming operation, document reading operation, and so forth, with respect to operations and processes that the image forming apparatus 1 is configured to perform. The operation unit 47 includes a display unit 473 for displaying operation guides for the user. In this embodiment the display unit 473 is constituted of a touch panel, so that the instructions to the image forming apparatus 1 are inputted through the touch panel when the user touches the buttons or keys displayed in the display unit 473.

The network interface unit 91 includes a communication module such as a local area network (LAN) board, and transmits and receives data to and from an external device 20 such as a personal computer in the local area or in the internet, through the LAN connected to the network interface unit 91.

The control unit 10 is configured to act, according to a control program installed in the HDD92, as the controller 100, a setting acceptance unit 101, an image data management unit 104, a correction instruction detection unit 105, a correction instruction registration unit 106, an image correction unit 107, a corrected image printing unit 108, a notification unit 109, an image data saving unit 111, a correction detail storage unit 112, a code storage unit 113, and a correction instruction storage unit 114. Here, the controller 100 and other components may each be constituted in the form of a hardware circuit, instead of being performed by the control unit 10 according to the control program.

The image data saving unit 111 saves the image data (data to be printed) of images previously printed by the image forming unit 12 on the recording sheet. The image data saving unit 111 exemplifies the saving unit in the disclosure.

The correction detail storage unit 112 stores therein correction details respectively associated with a plurality of codes. The detail of the correction process (correction detail) to be performed by the image correction unit 107 and the code associated with the detail constitute correction information. FIG. 2A is a table showing an example of data structure stored in the correction detail storage unit 112, in which data indicating a code "triangle" is stored in association with a correction detail "density", data indicating a code "cross" is stored in association with a correction detail "zoom in/out", and data indicating a code "circle" is stored in association with a correction detail "chroma". The correction detail storage unit 112 exemplifies the first storage unit in the disclosure.

The code storage unit 113 stores therein data of the codes (e.g., triangle, cross, circle, square, and star) prepared in advance, to be selected as the code indicating the correction detail. The code storage unit 113 exemplifies the second storage unit in the disclosure.

The controller 100 serves to control the overall operation of the image forming apparatus 1 and is connected to the document feeder 6, the document reading unit 5, the image forming unit 12, the image memory 32, the HDD92, the fixing unit 13, the operation unit 47, the facsimile communication unit 71, and the network interface unit 91, so as to control the mentioned functional units.

The setting acceptance unit 101 accepts various settings from the user. For example, when "special copy setting" is requested through operation of the operation unit 47, the setting acceptance unit 101 displays a special copy setting screen D1 illustrated in FIG. 3A on the display unit 473, so as to receive the request through the touch panel function of the operation unit 47. The setting acceptance unit 101 includes a code selection acceptance unit 102 and a code generation acceptance unit 103. A plurality of select buttons B1 to B5 are displayed in the special copy setting screen D1, and when the user selects one of the select buttons B1 to B5 the setting acceptance unit 101 accepts the setting corresponding to the select button.

When the setting acceptance unit 101 accepts the selection of the select button B4 indicating "code selection" in the special copy setting screen D1, the code selection acceptance unit 102 displays a code selection screen D2 illustrated in FIG. 3B on the display unit 473, according to the code data stored in the code storage unit 113, to accept the user's selection of the code through the operation unit 47. The code selection acceptance unit 102 exemplifies the first acceptance unit in the disclosure.

In the code selection screen D2, the select buttons B11 to B15, B21 to B25, and B31 to B35, each indicating the code to be selected, are displayed in association with the correction details "density", "zoom in/out", and "chroma" respectively, so that the code selection acceptance unit 102 accepts the user's code selection and accordingly updates the correction detail storage unit 112. For example, when the select button B15 is selected, the code selection acceptance unit 102 stores the data indicating the code "star" is stored in the correction detail storage unit 112, in association with the correction detail "density". Here, the code selection acceptance unit 102 inhibits duplicated selection of the same code, and therefore when the select button B15 is selected the select buttons B25, B35 are restricted from being selected.

Figure 3C:
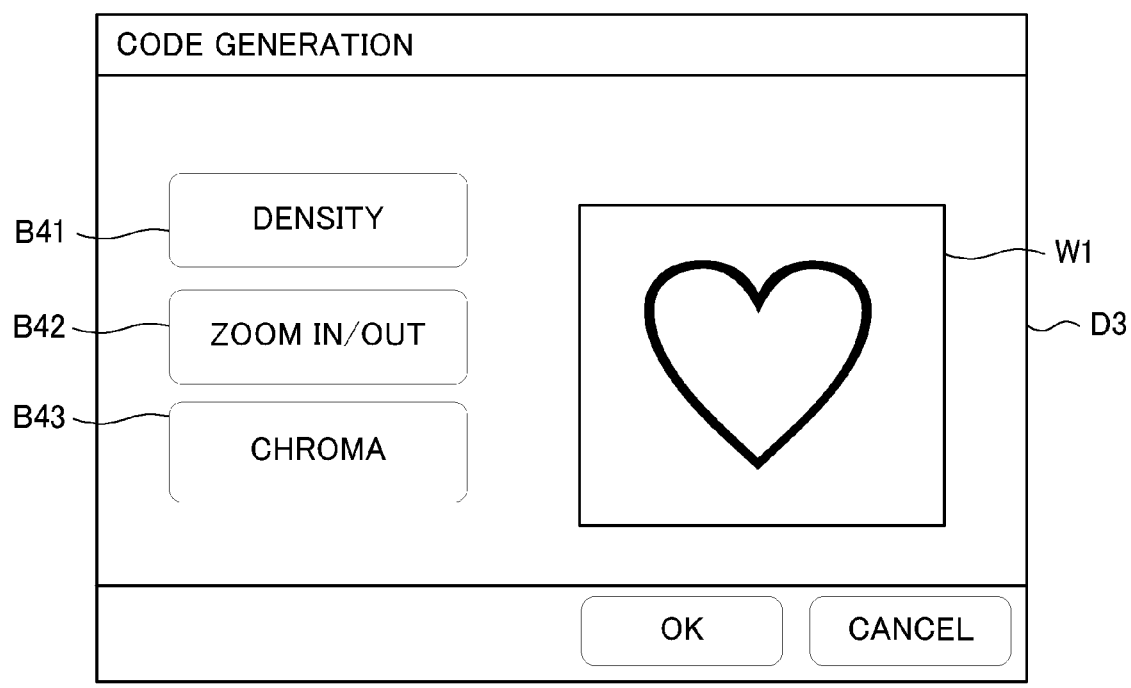

When the select button B5 indicating "code generation" on the special copy setting screen D1 is selected, the code generation acceptance unit 103 causes the display unit 473 to display a code generation screen D3 illustrated in FIG. 3C, so as to accept the generation of the code by the user, through the operation unit 47.

In the code generation screen D3, select buttons B41 to B43 respectively representing the correction details "density", "zoom in/out", and "chroma" are formed, and also a writing box W1 for accepting a code written (generated) therein is formed. The code generation acceptance unit 103 then updates the correction detail storage unit 112 according to the user's selection of the select buttons B41 to B43 and the content written in the writing box W1. For example, a code representing "heart" is written in the writing box W1 and the select button B42 is selected, data associated with the correction detail "zoom in/out" and represented by the code "heart" is stored in the correction detail storage unit 112.

Figure 4A:
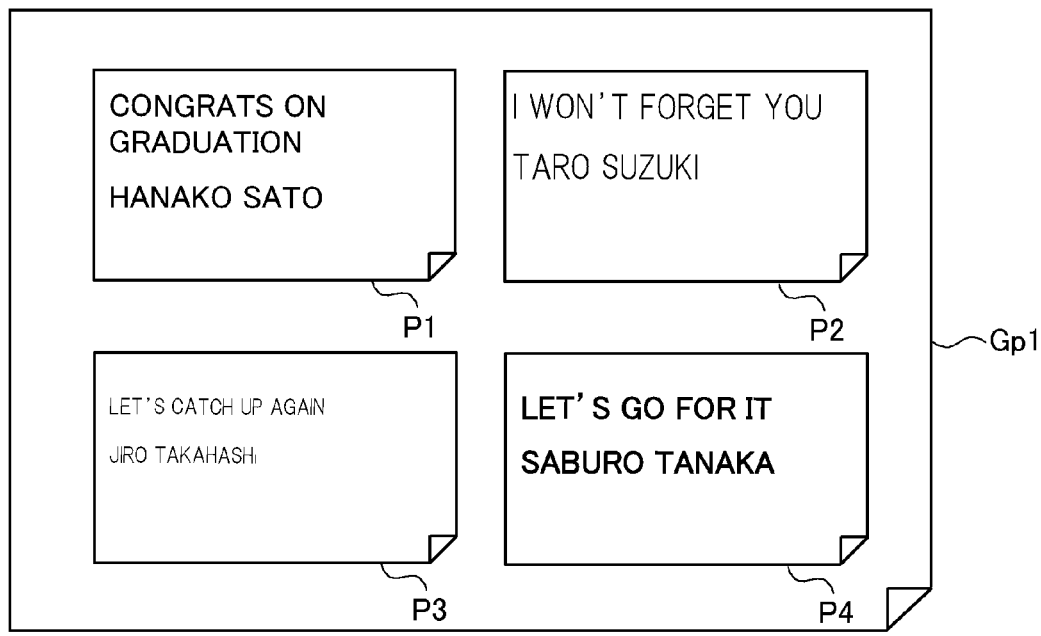
FIG. 4A, FIG. 4B, and FIG. 4C are schematic drawings for explaining images utilized during execution of processes.

The image data management unit 104 stores data of an image Gp (data used for printing an image Gp1 to be subsequently described) printed by the image forming unit 12 on the recording sheet, in the image data saving unit 111, for management. FIG. 4A is a schematic drawing of an example of the image based on the image data stored in the image data saving unit 111, and illustrates the image Gp1 representing a source document produced by sticking paper pieces P1 to P4 each having a person's message written thereon, onto a single sheet.

The correction instruction detection unit 105 compares between the image data of the source image read by the document reading unit 5 and having the correction instruction written thereon, and the image data of the image Gp stored in the image data saving unit 111, thereby extracting a differential image Gd, and detects the correction instruction on the basis of the extracted differential image Gd. Here, the correction instruction includes region information indicating the correction region to be corrected by the image correction unit 107, and correction information indicating the detail of the correction to be applied to the correction region. The correction instruction detection unit 105 exemplifies the detection unit in the disclosure.

Figure 4B:
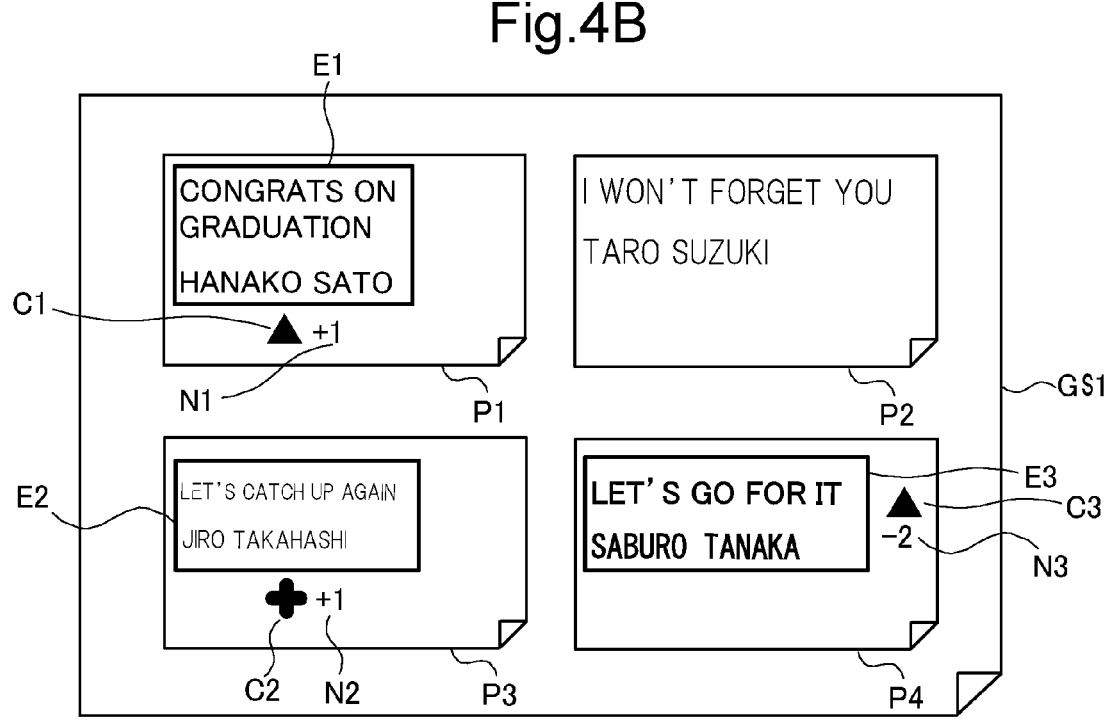
Figure 4C:
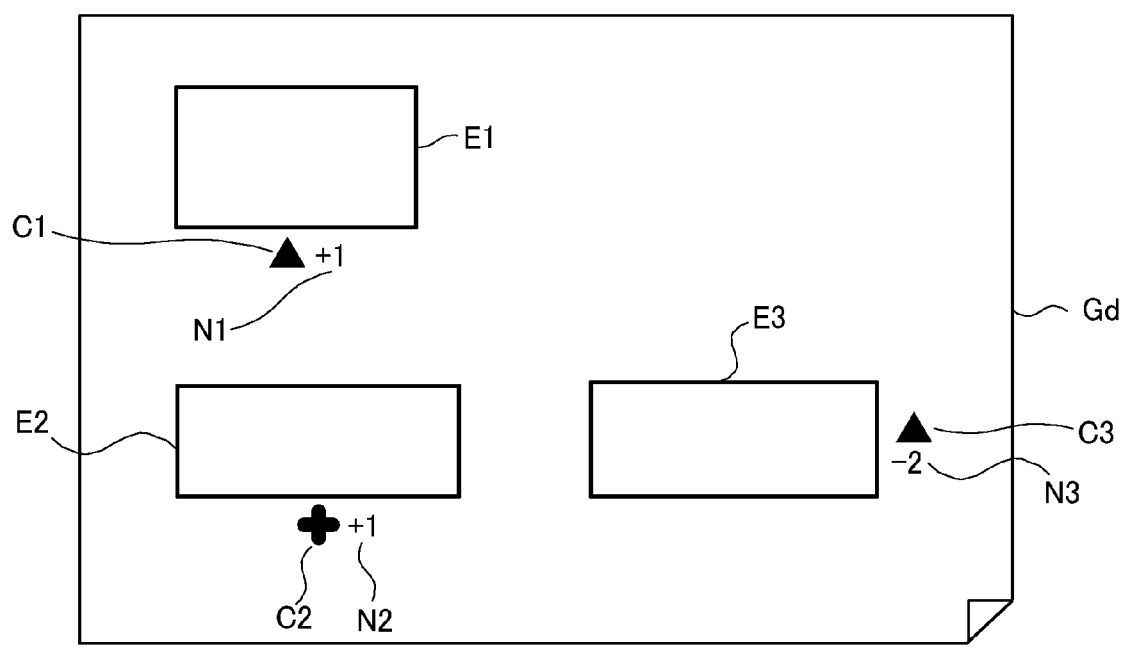

FIG. 4B illustrates an example of the source image in which the correction instruction is written, and FIG. 4C illustrates an example of the extracted differential image. The source image Gs1 shown in FIG. 4B represents the recording sheet having the image Gp1 printed thereon by the image forming unit 12 and on which the correction instruction is written, where E1 to E3 denote rectangular frames written on the recording sheet and representing the correction regions. In addition, C1 to C3 in FIG. 4B and FIG. 4C respectively denote the codes written close to the correction regions E1 to E3, and N1 to N3 respectively denote numerals written close to the codes C1 to C3.

The correction instruction detection unit 105 thus extracts the rectangular images, such as the images denoted by E1 to E3 and detects the coordinate position of the images, to thereby identify the correction region designated by the user as region to be corrected.

According to the example shown in FIG. 2A, the code C1 denoting the "triangle" corresponds to the correction detail "density", and the numeral N1 denoting "+1" corresponds to the correction detail "density +1". Therefore, the correction instruction detection unit 105 identifies that the correction detail "density" of the image in the correction region E1 is to be increased by one stage.

The correction instruction registration unit 106 stores the data indicating the correction detail detected by the correction instruction detection unit 105 in the correction instruction storage unit 114, in association with the region information indicating the region to be corrected.

The correction instruction storage unit 114 stores therein the region information indicating the correction region designated by the user by hand-writing, and the correction information indicating the correction detail applied to the correction region. The correction region may be designated by the user, for example by writing, on the printed matter, a rectangular image surrounding the region to be corrected in the printed matter.

FIG. 2B is a table showing an example of data structure stored in the correction instruction storage unit 114. According to FIG. 2B, in the correction instruction storage unit 114 the increasing of the density by one stage is stored in association with the correction region E1, enlarging of the image by one stage is stored in association with the correction region E2, and decreasing of the density by two stages is stored in association with the correction region E3.

The image correction unit 107 corrects the image data of the image Gp stored in the image data saving unit 111, according to the region information and the correction information stored in the correction instruction storage unit 114. The image correction unit 107 exemplifies the correction unit in the disclosure.

The corrected image printing unit 108 causes the image forming unit 12 to print an image Gr representing the image data corrected by the image correction unit 107.

When the corresponding image data is unavailable in the image data saving unit 111, the notification unit 109 serves to notify to this effect, for example by causing the display unit 473 to display a message to the same effect.

Figure 5:
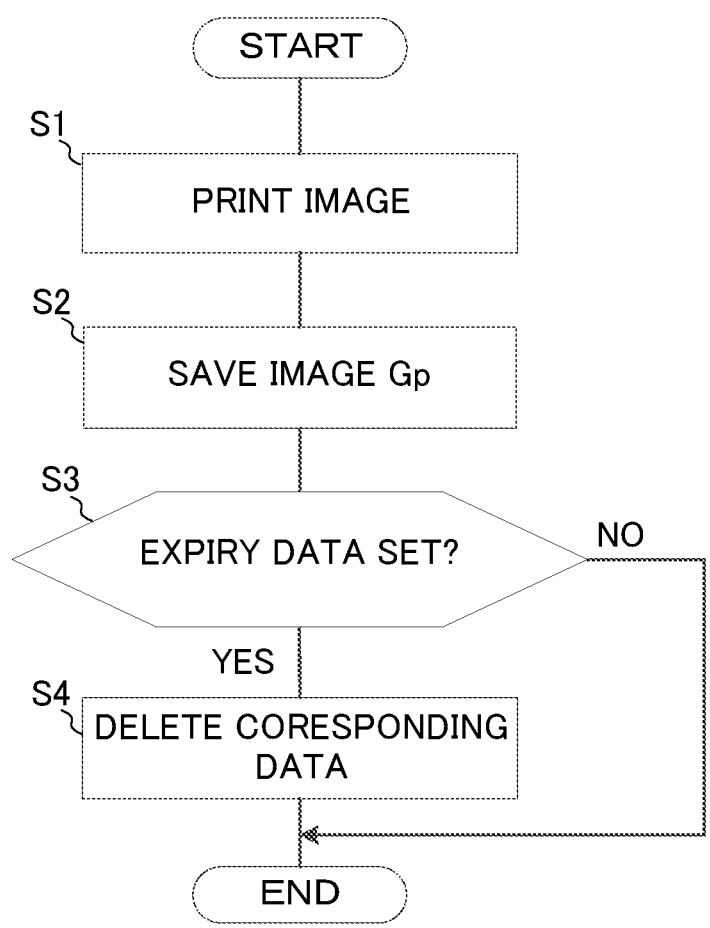
FIG. 5 is a flowchart showing an operation performed by a control unit of the image forming apparatus.

Hereunder, description will be given on an operation performed by the control unit 10 of the image forming apparatus 1 when the user inputs, for example, an instruction to copy a source document through the operation unit 47. FIG. 5 is a flowchart showing an operation performed by the control unit 10.

When the user inputs the instruction to copy the source document and the setting acceptance unit 101 receives the instruction, the controller 100 controls the image forming unit 12 so as to execute the printing according to the instruction (S1). Then the image data management unit 104 stores the image data of the image Gp printed by the image forming unit 12, in the image data saving unit 111 together with date-and-time data (S2).

The image data management unit 104 then decides whether any of the image data in the image data saving unit 111 has been stored therein for a predetermined period of time (e.g., 24 hours) according to the date-and-time data (S3). In the case where the image data management unit 104 decides that the image data saving unit 111 contains such image data (YES at S3), the image data management unit 104 deletes such image data from the image data saving unit 111 (S4). By doing so, the vacant capacity of the image data saving unit 111 can be prevented from being occupied by old image data.

Upon deciding that no image data has been stored in the image data saving unit 111 for the predetermined period of time (NO at S3), the image data management unit 104 finishes the operation.

In the foregoing case, the image data management unit 104 stores the image data of the image Gp in the image data saving unit 111. Alternatively, the setting acceptance unit 101 may be configured to receive the user's selection on whether the image data of the image Gp is to be stored in the image data saving unit 111, so that the image data management unit 104 stores the image data of the image Gp in the image data saving unit 111, according to the user's selection result received by the setting acceptance unit 101.

In addition, the deletion of the image data of the image Gp may be carried out by the image data management unit 104, when a reset button provided in the operation unit 47 is pressed, or when a select button B3 for selecting "finish correction of hand writing" shown in FIG. 3A is pressed, which will be subsequently described in detail.

Figure 6:
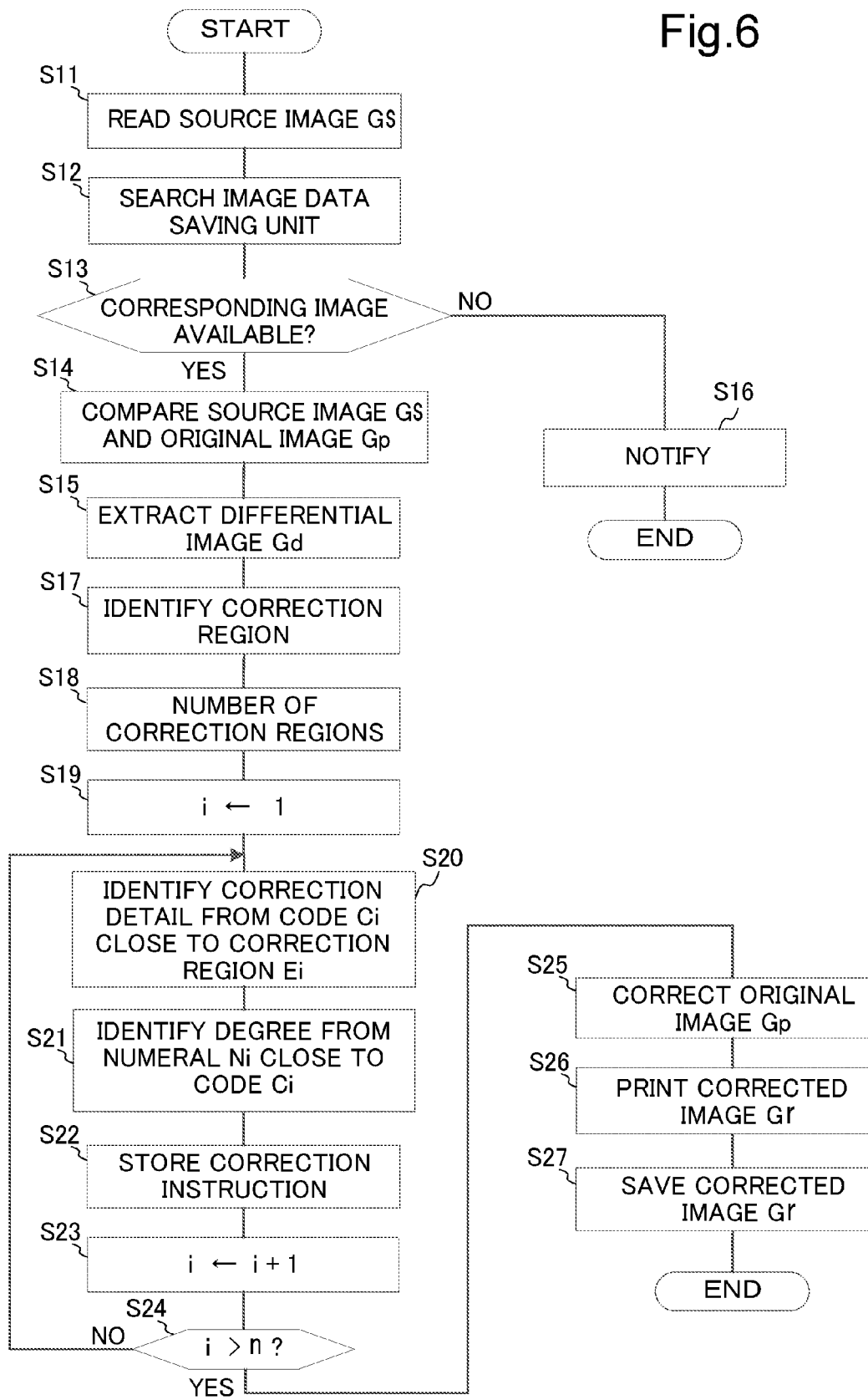
FIG. 6 is a flowchart showing another operation performed by the control unit of the image forming apparatus.

Hereunder, description will be given on an operation performed by the control unit 10 of the image forming apparatus 1 when a select button B1 indicating "correction of hand writing" in the special copy setting screen D1 shown in FIG. 3 is selected. FIG. 6 is a flowchart showing another operation performed by the control unit 10.

When the user presses the select button B1 to select "correction of hand writing" and the setting acceptance unit 101 receives the instruction, the controller 100 instructs the document reading unit 5 to read the source document, so that the document reading unit 5 reads the source image Gs and acquires the image data (S11). It is for example the source image Gs1 shown in FIG. 4B that is read at this point, i.e., the recording sheet with the image Gp1 shown in FIG. 4A printed thereon, and on which the correction instruction is written.

Then the correction instruction detection unit 105 searches the image data saving unit 111 (S12), to thereby decide whether the image Gp, which is the origin of the source image Gs read by the document reading unit 5, is present in the image data saving unit 111 (S13). To be more detailed, the correction instruction detection unit 105 compares between the image data of the source image Gs and the image data of the image Gp, to thereby find the image contained in the source image Gs.

Upon deciding that the image Gp which is the origin of the source image Gs (i.e., image contained in the source image Gs) is present in the image data saving unit 111 (YES at S13), the correction instruction detection unit 105 compares between the image data of the source image Gs and the image data of the image Gp which is the origin the former (S14), to thereby extract the image data of the differential image Gd (S15).

To extract the differential image Gd, the correction instruction detection unit 105 decides that a portion matches when a degree of difference between the source image Gs and the image Gp is lower than a predetermined threshold, but decides that the portion does not match when the degree of difference is higher than the threshold, and extracts that portion. Here, binarizing the image data for comparison based on the presence of black portions simplifies the difference extraction.

In contrast, when the correction instruction detection unit 105 decides at S13 that the image Gp which is the origin of the source image Gs is not present in the image data saving unit 111 (NO at S13), the notification unit 109 causes the display unit 473 to display a message to the effect that "the corresponding image data is unavailable" (S16).

The correction instruction detection unit 105 then identifies the correction region on the basis of the image data of the differential image Gd extracted as above (S17), and calculates the number of correction regions n (S18). For example, the correction instruction detection unit 105 detects the coordinates of the upper left corner and lower right corner of rectangular frames thereby identifying the correction regions E1 to E3, as in the source image Gs1 shown in FIG. 4B. To designate the correction region, any shape that can form a frame may be adopted, without limitation to rectangular. For example, a circle or an ameba shape may be adopted, and alternatively corners of a rectangle may also be adopted.

The correction instruction detection unit 105 sets a coefficient i to "1" (S19), and identifies the correction detail (S20) on the basis of a code Ci written within a predetermined range around a correction region Ei, and the data stored in the correction detail storage unit 112 (FIG. 2A). For example, the correction instruction detection unit 105 identifies the correction detail as "density", when the code C1 written in the predetermined range around the correction region E1 is "triangle" as shown in FIG. 4B.

The correction instruction detection unit 105 also identifies the degree of correction on the basis of the numeral Ni written within a predetermined range around the code Ci (S21). For example, the correction instruction detection unit 105 identifies the correction detail as "increase density by one stage" when the numeral N1 written within the predetermined range around the code C1 is "+1" as shown in FIG. 4B.

Then the correction instruction registration unit 106 stores the correction information indicating the correction instruction detected by the correction instruction detection unit 105 in the correction instruction storage unit 114 (FIG. 2B) (S22), and the correction instruction detection unit 105 adds "1" to the coefficient i (S23) and decides whether the coefficient i is larger than the number of correction regions n (S24). When the correction instruction detection unit 105 decides that the coefficient i is not larger than the number of correction regions n (NO at S24), still there are correction regions with respect to which the correction detail has not been identified. Accordingly, the process returns to S20.

In contrast, when the correction instruction detection unit 105 decides that the coefficient i is larger than the number of correction regions n (YES at S24), the correction detail has been identified with respect to all the correction regions. Therefore, the image correction unit 107 corrects the image data of the image Gp stored in the image data saving unit 111, which is the origin of the source image Gs, according to the correction instruction stored in the correction instruction storage unit 114 (S25).

Then the corrected image printing unit 108 causes the image forming unit 12 to perform printing according to the image data of the corrected image Gr corrected by the image correction unit 107 (S26), after which the image data management unit 104 stores the image data of the corrected image Gr printed by the image forming unit 12 in the image data saving unit 111, together with the date-and-time data (S27).

Figure 7A:
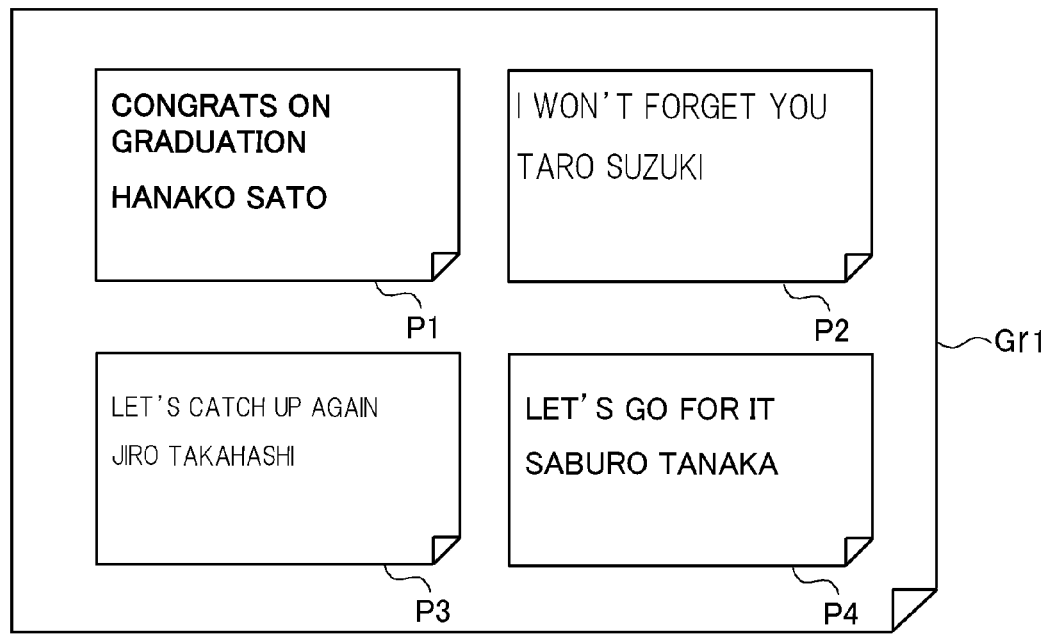
FIG. 7A, FIG. 7B, and FIG. 7C are schematic drawings for explaining images utilized during execution of other processes.

FIG. 7A illustrates an example of the corrected image, which represents a corrected image Gr1 based on the image Gp1 shown in FIG. 4A. As is apparent from FIG. 7A, in the corrected image Gr1 the density of the message on the paper piece P1 has been increased, the size of the message on the paper piece P3 has been enlarged, and the density of the message on the paper piece P4 has been reduced, compared with the image Gp1.

Figure 8:
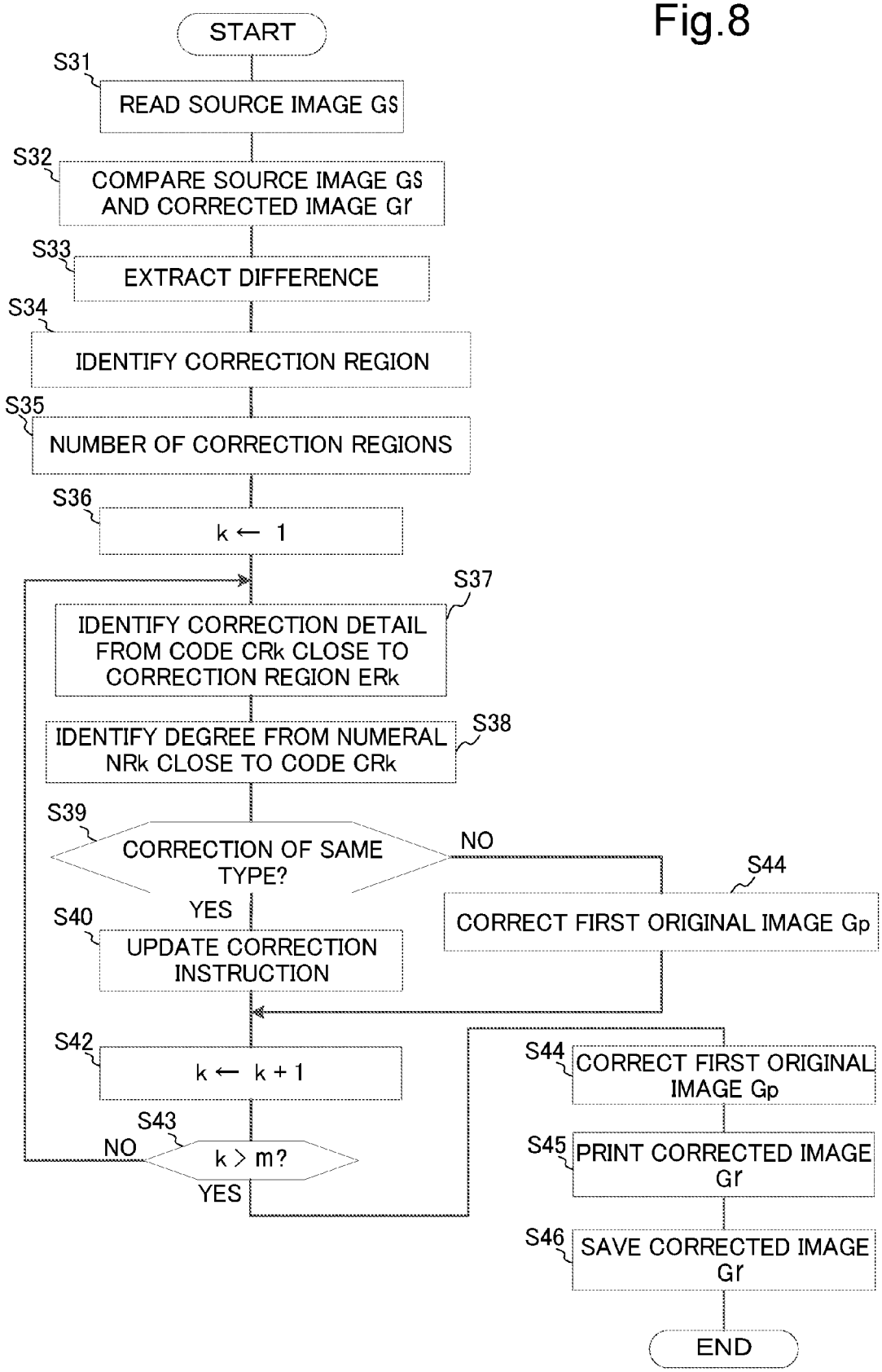
FIG. 8 is a flowchart showing still another operation performed by the control unit of the image forming apparatus.

Hereunder, description will be given on an operation performed by the control unit 10 of the image forming apparatus 1 when a select button B2 indicating "additional correction of hand writing" in the special copy setting screen D1 shown in FIG. 3 is selected. FIG. 8 is a flowchart showing still another operation performed by the control unit 10.

Here, it is when the printed result obtained through the foregoing correction is still unsatisfactory, that the select button B2 indicating "additional correction of hand writing" is selected. The following description refers to the case where the size of the message on the paper piece P3 in the corrected image Gr1 shown in FIG. 7A has proved to be still too small.

When the user instructs further image correction by pressing the select button B2 for selecting "additional correction of hand writing", after the image correction by the image correction unit 107 (S25) and the image formation by the image forming unit 12 (S26), the setting acceptance unit 101 accepts the instruction for further image correction. Then the controller 100 instructs the document reading unit 5 to read the source document, so that the document reading unit 5 reads the source image Gs and acquires the image data thereof (S31). Here, the image read at this point is, for example, a source image Gs2 shown FIG. 7B, which is formed by writing further correction instructions on the recording sheet on which the corrected image Gr1 obtained through S25 and S26 is printed.

Then the correction instruction detection unit 105 compares between the image data of the source image Gs read by the document reading unit 5 and the image data of the corrected image Gr stored in the image data saving unit 111 (i.e., the corrected image which is the origin of the source image Gs on which the correction instruction is written) (S32), to thereby extract the image data of a differential image Gd (S33). Here, the image data of the corrected image Gr exemplifies the corrected image data in the disclosure.

Figure 7B:
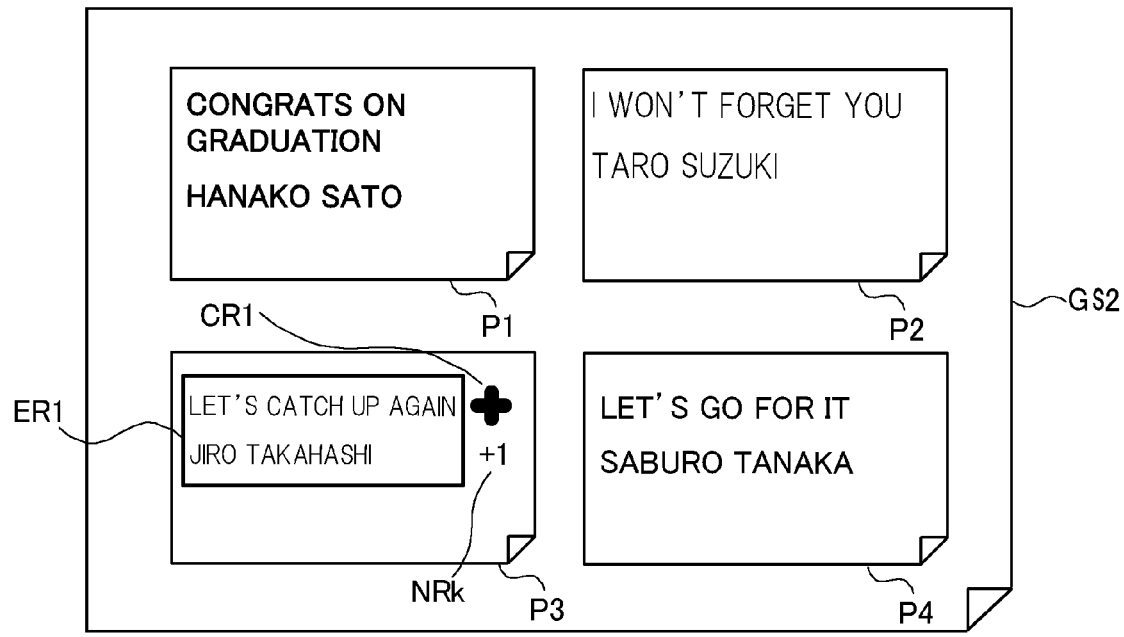

The correction instruction detection unit 105 then identifies the correction region on the basis of the image data of the differential image Gd extracted as above (S34), and calculates the number of correction regions n (S35). The correction instruction detection unit 105 also sets a coefficient k to "1" (S36), and identifies the correction detail according to a code CRk written within a predetermined range around a correction region ERk and the data stored in the correction detail storage unit 112 (S37). For example, the correction instruction detection unit 105 identifies the correction detail as "zoom in/out" when a code CR1 written close to a correction region ER1 is "cross" as shown in FIG. 7B.

In addition, the correction instruction detection unit 105 identifies the degree of correction designated by the on-going correction instruction according to a numeral NRk written close to the code CRk (S38), and decides whether correction of the same type has previously been instructed in the region overlapping the correction region ERk, on the basis of the correction details stored in the correction instruction storage unit 114 (S39).

Upon deciding that the correction of the same type has previously been instructed in the region overlapping the correction region ERk (YES at S39), the correction instruction detection unit 105 updates the correction instruction stored in the correction instruction storage unit 114 (S40). When the correction instruction detection unit 105 decides, for example, that the same correction detail "zoom in/out" was previously instructed in the correction region E2 (FIG. 4B) overlapping a correction region ER1 (FIG. 7B) (i.e., the same correction detail "zoom in/out" and the degree of correction are stored in the correction instruction storage unit 114), updates the correction region from "correction region E2" to "correction region ER1". Regarding the correction detail, in the case where the degree of correction newly instructed this time is "+1", the correction instruction detection unit 105 adds "+1" to the previous degree of correction "+1" thereby updating to "zoom in/out (+2)", and stores the updated correction detail and the degree in the correction instruction storage unit 114.

In contrast, when the correction instruction detection unit 105 decides that the correction of the same type has not previously been instructed in the region overlapping the correction region ERk (NO at S39), the correction instruction registration unit 106 stores the correction instruction detected by the correction instruction detection unit 105, in the correction instruction storage unit 114 (S41).

Then the correction instruction detection unit 105 adds "1" to a coefficient k (S42), and decides whether the coefficient k is larger than the number of correction regions m (S43). When the correction instruction detection unit 105 decides that the coefficient k is not larger than the number of correction regions m (NO at S43), still there are correction regions with respect to which the correction detail has not been identified. Accordingly, the process returns to S37.

In contrast, when the correction instruction detection unit 105 decides that the coefficient k is larger than the number of correction regions m (YES at S43), the correction detail has been identified with respect to all the correction regions. Therefore, the image correction unit 107 corrects the image data of the image Gp stored in the image data saving unit 111, which is the first origin of the source image Gs, according to the correction instruction stored at this point in the correction instruction storage unit 114 (S44). Here, the image Gp exemplifies the original image in the disclosure.

Then the corrected image printing unit 108 causes the image forming unit 12 to perform printing according to the image data of the corrected image Gr corrected by the image correction unit 107 (S45), after which the image data management unit 104 stores the image data of the corrected image Gr printed by the image forming unit 12 in the image data saving unit 111, together with the date-and-time data (S46).

Figure 7C:
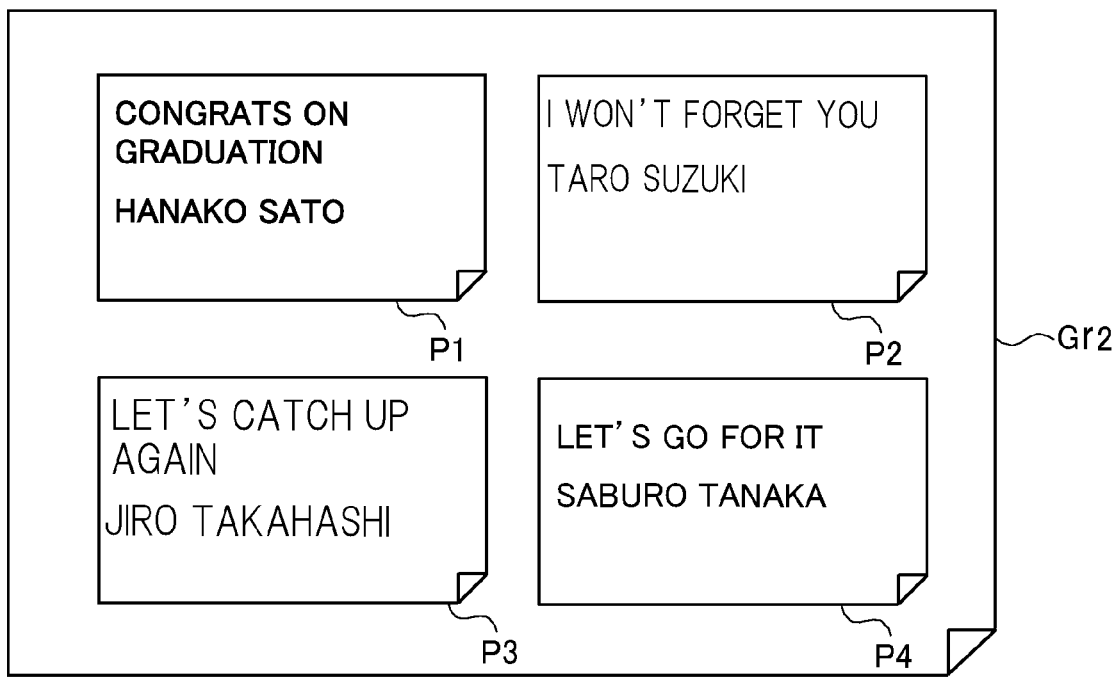

Through the foregoing correction process, as shown in FIG. 7C, the size of the message on the paper piece P2 is increased in a corrected image Gr2, compared with the corrected image Gr1. FIG. 7C illustrates an example of the corrected image, representing the corrected image Gr2 corrected from the corrected image Gr1 shown in FIG. 7A.

Hereunder, description will be given on an operation performed by the control unit 10 of the image forming apparatus 1 when a select button B3 indicating "finish correction of hand writing" in the special copy setting screen D1 shown in FIG. 3 is selected.

When the select button B3 indicating "finish correction of hand writing" is pressed and the setting acceptance unit 101 accepts the instruction, the image data management unit 104 deletes the image data stored in the image data saving unit 111, and also the data indicating the correction instruction stored in the correction instruction storage unit 114.

According to the foregoing embodiment, the image is corrected on the basis of the correction instruction written on the recording sheet having the image printed thereon, and the corrected image is printed. Therefore, correction of the image can be instructed by writing the correction instruction in an unsatisfactory printed result, such as an image with uneven balance as a whole, and consequently the image correction instruction can be quickly made through a simple process.

In addition, the correction instruction (i.e., remedy to resolve dissatisfaction) can be written directly in the unsatisfactory printed result, which allows the correction instruction to be intuitively made up. The unsatisfactory printed result (i.e., failed output) itself can also be utilized for writing the correction instruction thereon, instead of being disposed of as waste.

Further, since the image correction is instructed by writing the instruction on the recording sheet, a local region can be corrected instead of collectively correcting the entire image. Therefore, even when the quality balance of different regions in the image is impaired owing to, for example, uneven density in those regions in the printed image, a printed result with well-balanced image quality as a whole can be obtained through a simple process.

The operation procedures of existing image forming apparatuses are not unified and hence the user interface (UI) is different depending on the model, which may confuse the users. However, the method of correction by writing instructions on the recording sheet is insusceptible to differences in UI specification, and therefore user-friendliness of the image forming apparatus can be improved.

Although the items for which the degree can be adjusted, such as "density", "zoom in/out", and "chroma" are referred to as correction detail in the foregoing embodiment, applicable correction details are not limited to those for which the degree can be adjusted. For example, "color" may be adopted as correction item, so as to designate a color to be modified by writing as "red", "blue", or "green". In addition, "erase" may be adopted as correction detail, to erase the image in the corresponding correction region.

Although the document reading unit 5 constitutes a part of the image forming apparatus 1 in the foregoing embodiment, an external device communicably connected to the image forming apparatus 1 and configured to acquire the image data by image pickup, such as a smartphone or a digital camera, may be employed in place of the document reading unit 5. In this case, correction instruction detection unit 105 compares between the image data of the source image read by the external device and having the correction instruction written thereon, and the image data of the image stored in the image data saving unit 111, thereby extracting a differential image, and detects the correction instruction on the basis of the extracted differential image. Naturally, the subsequent process is performed as described above.

Here, a technique is known that includes printing details of the setting for printing on a source document (original document), and analyzing the details of setting printed on the source document when copying the same document the next time, thereby enabling the source document to be automatically copied with the same setting as the previous time. Such a technique improves the operability of the image forming apparatus and promotes effective utilization of resources. With the mentioned technique, however, the details of setting are printed on the original source document itself, and hence the source document loses its originality, and besides there are source documents that do not accept the printing of the details of setting, such as important documents, rental documents, and books.

In addition, a technique of recopying a printed matter that has once been printed, with a print setting designated by the user, is known. This technique eliminates the need to newly specify the print setting when the recopying is performed. However, in the case of reprinting with modified print setting, detailed modification process has to be carried out from scratch, as with conventional image forming apparatuses.

Thus, the mentioned techniques have the drawbacks in that the originality of the source document is lost, and that a complicated process is required for inputting an image correction instruction. In addition, those techniques are unable to resolve the issue of the uneven quality balance among different regions of a printed image incidental to, for example, printing of a collection of messages.

In contrast, the configuration according to the foregoing embodiment enables the image correction instruction to be easily inputted, and also resolves the issue of the uneven quality balance among different regions of a printed image, for example incidental to printing of a collection of messages.

Further, the configurations and processes of the embodiment described with reference to FIG. 1 to FIG. 8 are merely exemplary, and not intended to limit the scope of the disclosure.

What is claimed is:

1. An image forming apparatus comprising:
   a document reading unit configured to read an image on a source document and acquires image data;
   an image forming unit configured to print an image on a recording sheet according to the image data;
   a saving unit configured to save the image data of images previously printed by the image forming unit on the recording sheet;
   a detection unit configured to extract difference between the image data on the recording sheet read by the document reading unit and on which a correction instruction is written and the image data stored in the saving unit and corresponding the image data on the recording sheet on which the correction instruction is written, and detect the correction instruction on a basis of the extracted difference;
   a correction unit configured to correct the image data stored in the saving unit, according to the correction instruction detected by the detection unit, the correction instruction including region information indicating a correction region to be corrected by the correction unit, and correction information indicating a detail of the correction to be applied to the correction region; and
   a controller configured to cause the image forming unit to print an image representing the image data corrected by the correction unit,
   wherein the correction unit is configured to correct the image data in the region indicated by the region information included in the correction instruction detected by the detection unit, according to the correction detail indicated by the correction information included in the correction instruction.

2. The image forming apparatus according to claim 1, wherein the detection unit is configured to extract a frame image representing a frame written on the recording sheet and adopt position information of the frame image on the recording sheet as the region information, and detect, as the correction information, a code image representing a predetermined code and located within a predetermined range around the frame image.

3. The image forming apparatus according to claim 2, wherein the detection unit is configured to detect a numeral image representing a predetermined numeral and located within a predetermined range around the code, as part of the correction information to identify a degree of correction.

4. The image forming apparatus according to claim 3, wherein the predetermined numeral includes a ±symbol indicating whether the numeral is positive or negative.

5. The image forming apparatus according to claim 2, further comprising a first storage unit configured to store therein correction details respectively associated with a plurality of codes,
   wherein the detection unit is configured to read out, from the first storage unit, the correction detail corresponding to the code represented by the detected code image, to thereby detect the correction information.

6. The image forming apparatus according to claim 5, further comprising a second storage unit configured to store therein code data representing codes for selection each indicating a correction detail; and
   a first acceptance unit configured to accept selection of one of the codes representing the correction detail by a user out of the codes represented by the code data stored in the second storage unit, and store the selected code in the first storage unit in association with the corresponding correction detail.

7. The image forming apparatus according to claim 6, further comprising a code generation acceptance unit configured to accept generation of a code corresponding to the correction detail by the user, and store the generated code in the first storage unit in association with the corresponding correction detail.

8. The image forming apparatus according to claim 1, further comprising a setting acceptance unit configured to accept an execution instruction of an additional image correction from the user, after the image correction by the correction unit and the image formation by the image forming unit,
   wherein the saving unit is configured to store therein image data of an original image yet to be corrected by the correction unit, and corrected image data corrected by the correction unit and subjected to image formation by the image forming unit,
   the detection unit is configured to (i) extract, when the setting acceptance unit accepts the execution instruction of the additional image correction, a difference between the image data of the recording sheet read by the document reading unit and on which the correction instruction is written, and the corrected image data stored in the saving unit, and (ii) detect the correction instruction on a basis of the extracted difference and add, in a case where the correction specified by the correction instruction was previously performed, a degree of correction specified by the correction instruction to a degree of the previous correction, and the correction unit is configured to correct the image data of the original image stored in the saving unit, according to the detected correction instruction and with the degree of correction after the addition.

9. The image forming apparatus according to claim 1, wherein the document reading unit is an external device communicably connected to the image forming apparatus and configured to acquire the image data by image pickup.

* * * * *